Jan. 27, 1970 E. H. LAND 3,492,412

MISREGISTRATION CORRECTION SYSTEM AND METHOD

Filed March 9, 1966

2 Sheets-Sheet 1

INVENTOR
Edwin H. Land

BY Brown and Mikulka and Richard L. Aitken

ATTORNEYS

INVENTOR
Edwin H. Land
BY Brown and Mikulka and
Richard L. Aitken
ATTORNEYS

United States Patent Office 3,492,412
Patented Jan. 27, 1970

3,492,412
MISREGISTRATION CORRECTION SYSTEM AND METHOD

Edwin H. Land, Cambridge, Mass., assignor to Polaroid Corporation, Cambridge, Mass., a corporation of Delaware Filed Mar. 9, 1967, Ser. No. 621,827
Int. Cl. H04n 1/46, 9/00
U.S. Cl. 178—5.2 9 Claims

ABSTRACT OF THE DISCLOSURE

This specification discloses a color television system of the type in which red and white images are generated in a color picture tube by electron beams of different velocities. The red and white images are made to register by compensation provided in the television camera, which comprises two vidicons for producing red and green video signals. The raster swept by the electron beam in the vidicon producing the red video signal is made larger than the image of the scene to be televised focused on the face of the vidicon. The red video signal produced by this vidicon is used to control the intensity of the lower velocity electron beam in the color picture tube. The enlarged raster is offset from the center of the image of the scene to be televised to compensate for the fact that the electron beams produced in the color picture tube are offset from one another.

BACKGROUND OF THE INVENTION

This invention relates to television systems, and more particularly to a color television system utilizing a color picture tube of the pentration type with improved means to achieve registration of images in the color picture tube.

Some color television receivers and display systems employ color picture tubes the screens of which are formed of phosphor layers which produce light of different colors when excited by impinging electrons. Images of different colors are produced by accelerating the electrons in the electron beams to different velocities so that they penetrate to different depths in the laminated screen. Picture tubes which produce images of different colors in this manner are referred to as penetration type color picture tubes. A red image, for example, might be produced with electrons of relatively low velocity and a white image might be produced by electrons of relatively high velocity. Such images, if properly constituted, can be combined to be perceived as an image in fulll color. In order to combine these images of different colors into a single full color image, the images must be made to register on the screen of the picture tube. This requirement presents a problem because each image is produced by accelerating the electrons of the beam producing such image to a different velocity. The slower velocity electrons will be deflected more by a given deflection field than the higher velocity electrons. As a result, if no compensation were provided, the image produced by the lower velocity electrons would be larger than the image produced by the higher velocity electrons, and the two images would not register.

In prior art systems utilizing a plurality of electron guns, registration of the images has been achieved by shielding the lower velocity electrons for part of their travel through the deflection field. In a single gun picture tubes of the pentration type, in which the different images are produced by cyclically switching the velocity of the electrons in the electron beam, registration has been achieved by cyclically switching the strength of the deflection fields in synchronism with the switching of the electron beam velocity, or by electrostatic lens effects.

SUMMARY OF THE INVENTION

In contradistinction to these systems of the prior art, the color television system of the present invention achieves registration of the images on the screen of the penetration type picture tube by a method of compensation provided at the television camera rather than at the receiver or in the color television picture tube. In the camera, the scene to be televised is transmitted through filters of different wavelengths to form image components of the scene, each image component representing a different wavelength content of the scene. These image components are then scanned by electron beams to produce color video signals. In accordance with one embodiment of the present invention, the field scanned by the electron beam in scanning one of the image components is made larger than the image component which it scans. As a result, the electron beam will scan more rapidly across any particular region of this image component than the electron beam will scan across an equivalent region of the other image component. The video signal which is produced from the former image is used to modulate a lower velocity electron beam in the color picture tube and the video signal which is produced from the latter image is used to modulate a higher velocity electron beam in the color picture tube. Because of the way in which the images are scanned in the television camera, the images produced by the color picture tube will register on the picture tube screen even though the images are produced by electron beams accelerated to different electron velocities. In accordance with the present invention, compensation is also provided in the television camera for the offset between the two electron guns in the television picture tube.

Accordingly, an object of the present invention is to provide an improved color television system and method.

Another object of the present invention is to provide an improved system and method for achieving registration of images in a color television picture tube.

A further object of the present invention is to provide an improved system and method for achieving registration of images produced in a television picture tube by electron beams containing electrons of different velocities.

A still further object of the present invention is to provide a television system and method in which registration of images produced in a picture tube by electron beams of different velocities is achieved by compensation provided in the television camera.

A still further object of the present invention is to provide compensation in the television camera to achieve registration of images produced in the picture tube by offset electron beams.

Further objects and advantages of the present invention will become readily apparent as the following detailed description of the invention unfolds, and when taken in conjunction with the drawings, wherein:

DESCRIPTION OF THE PREFERRED EMBODIMENT

Figure 1:
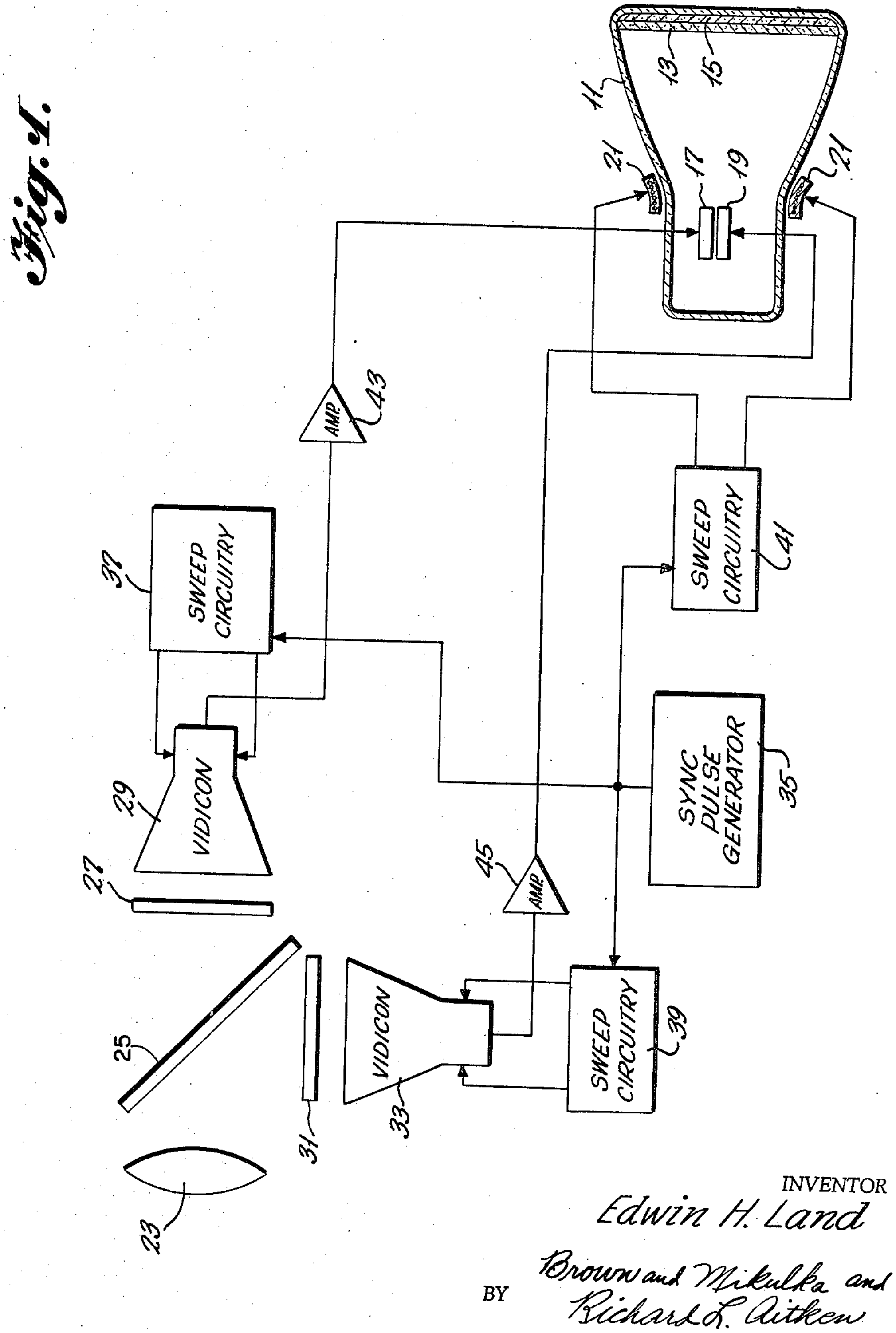
FIGURE 1 illustrates a color television system in which the present invention is incorporated.

A color television system of the present invention as shown in FIG. 1 utilizes a color picture tube or kinescope 11 of the penetration type. The cathodoluminescent screen of the picture tube 11 is formed of two light emissive phosphor layers 13 and 15. The layer 13 nearer the electron gun may emit red light when excited by impinging electrons and the layer 15 may emit minus-red or cyan light when excited by impinging electrons. The picture tube 11 is provided with two electron guns 17 and 19. The electron gun 17 generates an electron beam in which the electrons are accelerated to a velocity such that they penetrate only into the layer 13 and thus the electron beam produced by the electron gun 17 causes only red light to be produced on the screen of the picture tube 11. The electron gun 19 generates an electron beam containing electrons which are accelerated to a higher velocity such that they will penetrate through the layer 13 and into the layer 15. As a result, the electron beam produced by the gun 19 will cause the layer 13 to give off red light and at the same time cause the layer 15 to give off cyan light. This combination of wavelengths can combine to produce white light and thus the electron beam produced by the gun 19 will cause white light to be produced on the screen of the picture tube 11. The term "white light" should, of course, be understood to include light of pale hue which is accepted by an observer as approximately white, for example, skylight, sunlight and tungsten lamplight.

If the intensity of the electron beam produced by the low energy electron gun 17 is controlled in accordance with a video signal and conventional sweep signals are applied to the deflection coils 21 of the picture tube 11, a kinescopic image will be produced on the screen of the picture tube in red light. If the intensity of the electron beam produced by the high energy electron gun 19 is controlled in accordance with a video signal and conventional sweep signals are applied to the deflection coils 21, a kinescopic image will be produced on the screen of the picture tube 11 in white light. If a red video signal is applied to the electron gun 17 and a corresponding green video signal is applied to the electron gun 19 and the resulting red and white images are made to register on the screen of the picture tube 11, the red and white images will combine to be perceived by the viewer as an image in full color. This phenomena of color perception is described in an article entitled "The Retinex" by Edwin H. Land, published in the June 1964 issue of American Scientist, pages 247–264.

Because the electron beam produced by the electron gun 19 is accelerated to a higher velocity than the electron beam produced by the electron gun 17, the former electron beam will be deflected by the deflection field to a lesser extent than the latter electron beam and unless some compensation is provided, the white image produced by the higher velocity electron beam will be smaller than the red image produced by the lower velocity electron beam. Hence, the two images would not register. The system of the present invention provides the necessary compensation, not at the receiver, but at the television camera to achieve image registration regardless of whether the electron beams themselves are in registry or not.

As shown in the particular embodiment selected for illustration in FIG. 1, the scene to be televised is focused by a lens 23 and is split into two image components by a beam splitter 25. One image component, which is passed through a red filter 27, is focused on the face of a vidicon 29 and the other image component, which is passed through a green filter 31, is focused on the face of a vidicon 33. Thus, the two components are complementary in their light wavelength content. A sync pulse generator 5 generates horizontal and vertical sync pulses and applies them to sweep circuitry 37, which applies sweep signals to the vidicon 29 in synchronism with the applied sync pulses to cause the electron beam of the vidicon 29 to sweep a television raster on the face of the vidicon 29. As a result, the vidicon 29 will generate a red video signal. The sync pulses generated by the sync pulse generator 35 are also applied to sweep circuitry 39, which applies sweep signals to the vidicon 33 in synchronism with the applied sync pulses so that the electron beam of the vidicon 33 sweeps a television raster on the face of the vidicon 33. As a result, the vidicon 33 will generate a green video signal.

The horizontal and vertical sync pulses produced by the generator 35 are also applied to sweep circuitry 41, which applies conventional television sweep signals to the deflection coils 21 of the picture tube 11 so that the electron beams produced by the electron guns 17 and 19 sweep television rasters on the face of the picture tube 11 in synchronism with the sweeping of the rasters in the vidicons 29 and 33. The red video signal produced by the vidicon 29 is amplified by an amplifier 43 and is applied to the control grid of the electron gun 17 to control the intensity of the electron beam produced thereby so that an image component in red light is produced on the screen of the picture tube in accordance with the red video signal. The green video signal produced by the vidicon 33 is amplified by an amplifier 45 and is applied to the control grid of the electron gun 19 to control the intensity of the electron beam produced thereby so that an image component in white light is produced on the screen of the picture tube 11 in accordance with the green video signal.

The high energy beam produced by gun 19 and the low energy beam produced simultaneously by gun 17 are subjected to the same deflection fields, as mentioned above. The beams are therefore deflected differentially and do not coincide on the face of the kinescope except at a single point near the center of the viewing screen. This invention permits registry of the image components produced by the electron beams despite the differential deflection of the beams.

Figure 2A:
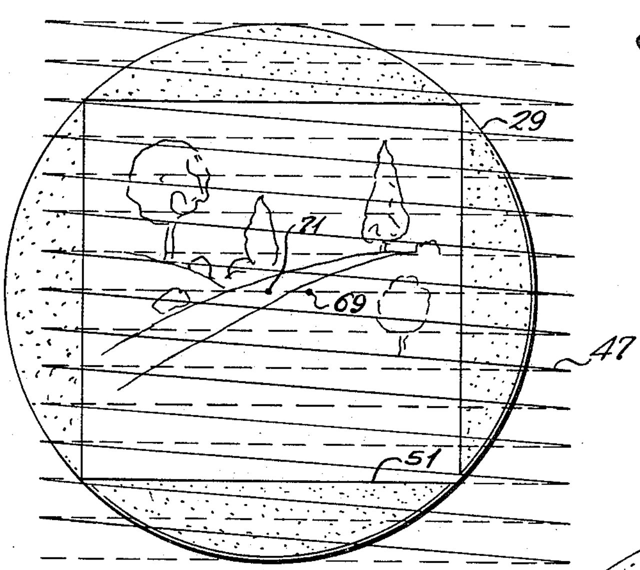
FIGS. 2*a* and 2*b* are front views of vidicons of the system of the present invention and schematically illustrate how compensation is provided in a television camera to achieve the desired registration of image components in the television picture tube in accordance with the present invention.
Figure 2B:
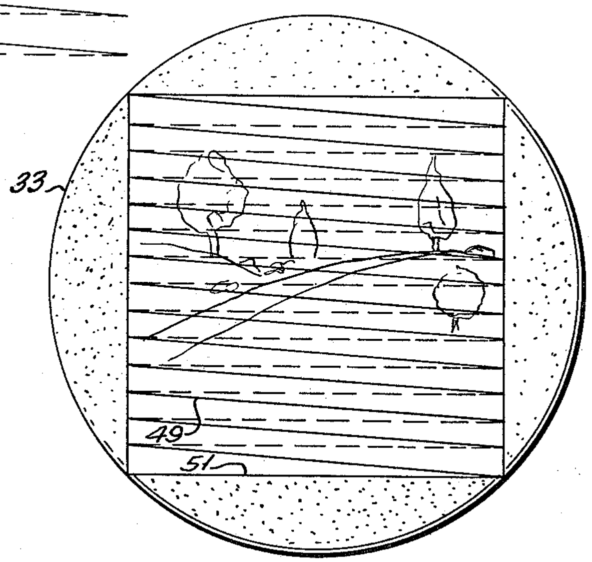

To make the two image components in red and white light the same size, the sweep circuitry 37 applies sweep signals to the vidicon 29 to cause the electron beam in the vidicon 29 to sweep a raster which is larger than the red image component focused on the face of the vidicon 29 whereas the sweep circuitry 39 applies sweep signals to the vidicon 33 to cause the electron beams of the vidicon 33 to sweep a raster on the face of the vidicon 33 the same size as the green image component focused on the face of the vidicon 33. FIG. 2*a* illustrates the size of the raster swept by the electron beam in the vidicon 29 relative to the size of the image component focused on the face of the vidicon 29, and FIG. 2*b* illustrates the size of the raster swept by the electron beam in the vidicon 33 relative to the size of the image component focused on the face of the vidicon 33. The raster swept by the electron beam in the vidicon 29 is designated by the reference number 47 and the raster swept by the electron beam in the vidicon 33 is designated by the reference number 49. The boundary of the image of the scene to be televised is designated by the reference number 51 on the face of both vidicons. FIGS. 2*a* and 2*b* are drawn to the same scale so that the relative sizes of the rasters 47 and 49 are illustrated. The ratio of the size of the raster 47 to that of the raster 49 is approximately the same as the ratio of the velocity of the electron beam produced by the electron gun 19 to that of the electron beam produced by the electron gun 17.

As will be seen from FIG. 2*a*, the peripheral portions of the raster 47 swept by the electron beam of the vidicon 29 are outside of the boundary 51 of the red image component to be televised and the video signal which is generated during this portion of the sweep is not used. The rastor 47 except for the size relative to the size of the image of the scene to be televised is a conventional television raster as is the raster 49. Accordingly, the two rasters 47 and 49 are geometrically similar. It will be noted that the electron beam of the vidicon 29 will scan across the red image component with a greater velocity than the beam of the vidicon 33 will scan across the green image component. In addition, scanning of the red image component will be started later and finished earlier than the scanning of the green image component. The size of the raster 47 is selected relative to the size of the raster 49 so that the red and white images produced on the screen of the color picture tube 11 are precisely the same size and thus can be made to register.

Figure 3:
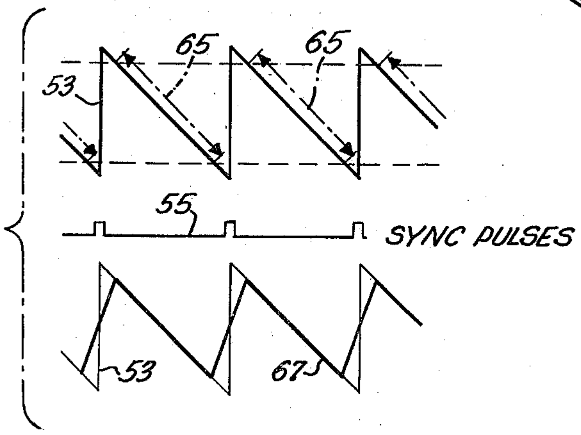
FIG. 3 illustrates waveforms which are used to explain the inventive concept of the present invention.

That portion of the red video signal which is produced when the electron beam of the vidicon 29 is outside the boundary 51 of the image focused on the face of the vidicon 29 will be applied to the electron gun 17 while the beam produced by the electron gun is outside of the viewing area of the screen of the picture tube 11 such as on the side walls of the picture tube 11. This portion of the video signal may be blanked out if desired. Because this portion of the video signal is not used, instead of applying conventional sweep signals to the vidicon 29, the sweep signals may be altered before being applied to the vidicon 29 in a manner illustrated in FIG. 3. In FIG. 3, the waveform 53 represents the sweep signal current applied to the horizontal deflection coil of the vidicon 29. This sweep signal is generated in response to the horizontal sync pulses shown in the waveform 55. The part of the sweep waveform 53 which occurs while the electron beam is actually scanning the image focused on the face of the vidicon 29 is that which is coextensive with the arrows 65. As the remaining part of the waveform is not used in the scanning, the remaining part of the waveform is not essential in the scanning operation and may be discarded. Accordingly, instead of the waveform 53, the current waveform 67 may be used to control the scanning. Waveform 53 is shown superimposed lightly on the waveform 67 where it differs therefrom to illustrate more clearly the differences between the two waveforms. If the waveform 67 were used to control the horizontal scanning of the vidicon 29 and a similar waveform were used to control the vertical scanning of the vidicon 29, the raster scanned on the face of the vidicon 29 would be coextensive with the image focused thereon instead of being larger than the image. It is preferable to use the waveform 53 to control the scanning of the vidicon 29 as such a waveform is more easily produced in synchronism with the sync pulses than would be the waveform 67. The waveform 67 merely serves to illustrate that the present invention is not limited to a system in which the size of the raster of the vidicon is increased relative to the image focused on the face of the vidicon.

It will be apparent that instead of increasing the size of the raster swept by the vidicon 29, the size of the image focused on the face of the vidicon could be reduced to achieve the desired results of making the red and white images produced by the picture tube 11 of the same size. Alternatively, the size of the raster swept by the vidicon 33 could be reduced or the size of the image focused on the face of the vidicon 33 could be increased.

With the size of the raster swept by the vidicon 29 adjusted as described above, the red and white image components produced in the picture tube 11 would register if the beams produced by the electron guns 17 and 19 were coaxial or were made to be coaxial. In the preferred embodiment of the present invention, the two electron beams are not coaxial. Because of this feature, the red and white image components produced by the electron guns 17 and 19, although being of the same size, would not register unless compensation were provided. In accordance with the present invention, this compensation is also provided in the vidicons 29 and 33. In accordance with the present invention, the rasters 47 and 49 which are scanned by the electron beams of the vidicons 29 and 33 are positioned relative to the image components which are focused on the faces of the vidicons so that the resulting red and white image components produced on the face of the picture tube 11 do register and as a result they combine to be perceived by the viewer as a component image in full color of the scene being televised. The positioning of the rasters is illustrated in FIGS. 2*a* and 2*b*. The raster 47 as shown in FIG. 2*a* is shifted to the right relative to the image component of the scene to be televised. The center of the raster 47 is designated by the reference number 69 whereas the center of the televised scene is designated by the reference number 71. The raster 49 as shown in FIG. 2*b* is centered relative to the scene to be televised. In the picture tube 11, the electron gun 19 is centered relative to the screen of the picture tube whereas the electron gun 17 is positioned to the right of center looking at the tube from the viewing screen end. The raster 47 is shifted to the right of center by an amount such that the resulting red image component produced by the electron gun 17 is centered on the screen of the picture tube 11 and accordingly will register with the white image component produced by the electron gun 19. Thus, the two images will combine to be perceived by the viewer as an image in full color.

With this arrangement, the point at which the two electron beams impinge upon the scene of picture tube 11 will only coincide once per scan of each raster. This point will be vertically centered on the picture tube screen but will be offset horizontally from the center of the tube.

Although the invention has been illustrated in connection with a two-color television system in which the resultant display is produced in terms of red and white visual stimuli, the principles of the invention are also applicable to other types of systems. For example, the same beneficial results may be obtained in a three-color system, wherein the resulting three image components are produced on the screen of the kinescope by three different electron beam energies. In such a system the third image component should bear a similar relationship to the second, as the second component bears to the first. In addition, the resulting stimuli produced by the penetration-type kinescope need not necessarily include a white image component specifically; conventional red, green, and blue image components may be produced, if the penetration kinescope is capable of rendering such image components at different beam energies. In another variation of the invention, the separate image components of the original scene may be scanned in a frame-sequential or line-sequential manner and the component image rendered on the face of the kinescope may be produced by a single electron gum, operating with sequentially switched accelerating potentials. Such a system is not preferred, however, because while one of the image components is being reproduced the other or others are not. Consequently, the composite image is not as bright as it might otherwise be. One advantage of this invention is that it permits two or more image components to be produced simultaneously and in registry by electron beams of different energies which are deflected to different degrees by the deflecting forces acting upon them.

It should therefore be understood that the preferred embodiment shown in the accompanying drawings is illustrative of the principles of this invention and that many variations and modifications may be made without departing from the spirit and scope of the invention in its broader aspects.

What is claimed is:

1. The method of televising and reproducing a composite image of an original scene which comprises:

producing at least two related image components of an original scene;

developing a first video signal by scanning one of said image components according to a predetermined line scan program;

developing a second video signal by scanning the other of said image components according to a line scan program similar to but larger than said predetermined line scan program in relationship to similar portions of said original scene; and reproducing a composite image of said original scene on the screen of a kinescope by modulating a relatively high energy electron beam impinging on said screen in accordance with said first video signal, modulating a relatively low energy electron beam impinging on said screen in accordance with said second video signal, and differentially deflecting said high and low energy electron beams by subjecting them to similar deflection fields in accordance with said predetermined line scan program to produce image components which are registered imagewise despite the differential deflection of said electron beams.

2. A television system comprising:

a television camera including means to scan a first image component of a scene to be televised in accordance with a first raster to generate a first video signal representing said first image component and to scan a second image component of the scene to be televised in accordance with a second raster to generate a second video signal representing the second image component, said first raster resulting in a greater scanning speed of said first image component than that of said second image component, a kinescope, and means including said kinescope responsive to said first video signal to produce a first kinescopic image component on the screen of said kinescope with electrons of a first velocity and responsive to said second video signal to produce a second kinescopic image component on the screen of said kinescope with electrons of a second velocity greater than said first velocity, the ratio of the scanning speed of said first raster relative to that of said second raster being such that said first and second kinescopic image components are of the same size and in registry.

3. A television system as recited in claim 2 wherein said first raster is larger relative to said first image component than said second raster is relative to said second image component.

4. A television system as recited in claim 3 wherein said kinescope includes a first electron gun operable to generate an electron beam of electrons accelerated to said first velocity for producing said first kinescopic image component and a second electron gun operable to generate an electron beam containing electrons accelerated to said second velocity for producing said second kinescopic image component, said first electron beam being offset from said second electron beam, said first raster being positioned relative to the image component scanned in accordance with said first raster and said second raster being positioned relative to the image component scanned in accordance with said second raster so that the offset between said electron beams is compensated and said first and second kinescopic image components are in registry.

5. A color television system as recited in claim 2 wherein the image component scanned in accordance with said first raster is complementary in light wavelength content to the image component scanned in accordance with said second raster, and wherein said first kinescopic image component has a different light wavelength content from said second kinescopic image component.

6. A color television system as recited in claim 5 wherein said first kinescopic image component is produced in red light and said second kinescopic image component is produced in white light.

7. A television system comprising:

television camera means including means for producing at least two complementary image components of an original scene;

first signal producing means for scanning one of said image components according to a predetermined line scan program to produce a first image signal component;

second signal producing means for scanning another of said image components according to a predetermined line scan program similar to but larger than said first-mentioned pattern by a predetermined ratio to produce a second image signal component;

means for reproducing a composite image of said original scene including a kinescope having a penetration-type cathodoluminecent screen constructed to emit light of one spectral characteristic when struck by electrons of a relatively low predetermined velocity and to emit light of a second and complementary spectral characteristic when struck by electrons of a relatively high predetermined velocity;

means including electron gun means for directing electron beams of said low and high velocities at said screen;

deflection means subjecting said low and high energy beams to substantially equivalent deflection fields for sweeping said beams across said screen in accordance with said predetermined line scan pattern to trace with said low energy electron beam a line scan pattern in any given area of said screen which is larger by said predetermined ratio than that traced by said high energy beam in the same area;

means for modulating said low energy beam in accordance with said second signal component; and means for modulating said high energy beam in accordance with said first signal component.

8. A television system comprising:

(A) image signal producing means including means for imaging at least two complementary image components of a scene to be televised, means for scanning one of said image components in accordance with a first predetermined line scan pattern to derive a first signal component representative of said one image component, and means for scanning another of said image components in accordance with a second line scan pattern similar to and, in relationship to equivalent areas of said image components, smaller than said first pattern by a predetermined ratio to derive a second signal component representative of said second image component; and (B) receiver means including a kinescope having a cathodoluminescent screen, electron gun means for producing a first electron beam directed to impinge on said screen at a first velocity and a second electron beam directed to impinge on said screen at a second velocity higher by said predetermined ratio than said first velocity, deflection means for subjecting each of said beams to similar deflection fields to sweep said beams across said screen according to said predetermined line scan patterns, whereby the pattern traced by said first electron beam on any portion of said screen is larger by said predetermined ratio than the pattern traced on said portion by said second beam, means for modulating said first beam in accordance with said first signal component to reproduce said first image component on said screen, and means for modulating said second beam in accordance with said second signal component to reproduce said second image component on said screen in registry with the first image component reproduced thereon.

9. A television system comprising:

a television camera including means to scan a first image component of the scene to be televised in accordance with a first raster to produce a first video signal representing the first image component and to scan a second image component of the scene being televised in accordance with a second raster to generate a second video signal representing the second image component;

a kinescope including a first electron gun for producing a first electron beam and a second electron gun for producing a second electron beam, said first electron beam being offset from said second electron beam; and means including said kinescope responsive to said first video signal to produce a first kinescopic image component on the screen of said kinescope with said first electron beam and responsive to said second video signal to produce a second kinescopic image component on the screen of said kinescope with said second electron beam, said first and second rasters being positioned relative to their respectively associated components so that the offset between said electron beams is compensated and said first and second kinescopic image components are registered.

References Cited

UNITED STATES PATENTS

| | | | |
|---|---|---|---|
| 3,188,507 | 6/1965 | Law et al. | 313—69 |
| 3,188,508 | 6/1965 | Thomas | 313—69 |

ROBERT L. GRIFFIN, Primary Examiner

R. L. RICHARDSON, Assistant Examiner

U.S. Cl. X.R.

315—19